United States Patent
Rajasekharan et al.

(10) Patent No.: US 11,611,574 B2
(45) Date of Patent: Mar. 21, 2023

(54) USER BEHAVIOR ANALYTICS FOR INSIDER THREAT DETECTION

(71) Applicant: Code42 Software, Inc., Minneapolis, MN (US)

(72) Inventors: Ajaykumar Rajasekharan, Longmont, CO (US); Matthew Mills Parker, Denver, CO (US); Daniel L. Sullivan, Denver, CO (US)

(73) Assignee: Code42 Software, Inc., Minneapolis, MN (US)

( * ) Notice: Subject to any disclaimer, the term of this patent is extended or adjusted under 35 U.S.C. 154(b) by 450 days.

(21) Appl. No.: 15/666,771

(22) Filed: Aug. 2, 2017

(65) Prior Publication Data

US 2019/0044963 A1 Feb. 7, 2019

(51) Int. Cl.
*H04L 29/06* (2006.01)
*H04L 9/40* (2022.01)
(Continued)

(52) U.S. Cl.
CPC ......... *H04L 63/1425* (2013.01); *G06N 20/00* (2019.01); *H04L 63/1416* (2013.01);
(Continued)

(58) Field of Classification Search
CPC ... H04L 63/08; H04L 63/083; H04L 63/1416; H04L 63/145; H04L 63/1433;
(Continued)

(56) References Cited

U.S. PATENT DOCUMENTS 7,640,589 B1 * 12/2009 Mashevsky ............. G06F 21/56
726/25
8,839,435 B1 * 9/2014 King ................... H04L 63/1425
726/22
(Continued)

OTHER PUBLICATIONS

Ting-Fang Yen et al., Beehive: Large-Scale Log Analysis for Detecting Suspicious Activity in Enterprise Networks, Dec. 9, 2013, ACM, pp. 199-208. (Year: 2013).*
(Continued)

*Primary Examiner* — Luu T Pham
*Assistant Examiner* — Fahimeh Mohammadi
(74) *Attorney, Agent, or Firm* — Schwegman Lundberg & Woessner, P.A.

(57) ABSTRACT

Disclosed in some examples are systems, methods, and machine readable mediums for identifying insider threats by determining file system element activity models that correlate to undesirable behavior and then utilizing the determined model to detect insider threats. Events involving file system elements of a client computing device (e.g., a network endpoint) may be monitored by a file system element monitoring application on the client computing device. The values of these signals are aggregated across all events of the same type that have occurred within a predetermined time window (e.g., an hour) for a particular client computing device. Each time an aggregated signal has a value over the threshold, an anomaly is recorded. Anomaly counts for each signal are then calculated as the aggregate number of anomalies for a particular signal over a second time period, the span of which is determined by the generation of first anomaly to the close of an alert by the network monitor. The anomaly counts for the signals are then weighted and summed to produce a risk score.

21 Claims, 7 Drawing Sheets

(51) Int. Cl.
*G06N 20/00* (2019.01)
*H04W 12/67* (2021.01)
*H04W 12/122* (2021.01)
*G06F 17/18* (2006.01)

(52) U.S. Cl.
CPC ....... *H04L 63/1433* (2013.01); *H04W 12/122* (2021.01); *H04W 12/67* (2021.01); *G06F 17/18* (2013.01)

(58) Field of Classification Search
CPC ..... H04L 63/1425; G06F 17/18; G06N 20/00; H04W 12/67; H04W 12/122
See application file for complete search history.

(56) References Cited

U.S. PATENT DOCUMENTS

| | | | | |
|---|---|---|---|---|
| 9,043,329 B1* | 5/2015 | Patton | ............... | G06N 7/005 |
| | | | | 707/740 |
| 9,721,296 B1* | 8/2017 | Chrapko | ............ | G06N 7/005 |
| 10,104,100 B1* | 10/2018 | Bogorad | ............ | H04L 63/1425 |
| 10,148,683 B1* | 12/2018 | Lin | ............... | H04W 12/06 |
| 2012/0290879 A1* | 11/2012 | Shibuya | ............ | G05B 23/021 |
| | | | | 714/26 |
| 2013/0212436 A1* | 8/2013 | Zhu | ............... | G06F 11/0763 |
| | | | | 714/35 |
| 2013/0318604 A1* | 11/2013 | Coates | ............... | G06F 21/554 |
| | | | | 726/22 |
| 2014/0189130 A1* | 7/2014 | Khandelwal | ............ | H04L 43/08 |
| | | | | 709/226 |
| 2015/0379357 A1* | 12/2015 | Datta | ............... | G06V 10/764 |
| | | | | 382/155 |
| 2016/0112440 A1* | 4/2016 | Kolton | ............... | G06F 21/567 |
| | | | | 726/1 |
| 2016/0226905 A1* | 8/2016 | Baikalov | ............ | H04L 63/1408 |
| 2016/0306965 A1* | 10/2016 | Iyer | ............... | G06Q 10/0635 |
| 2017/0091046 A1* | 3/2017 | Bangalore | ............ | G06F 16/2358 |
| 2017/0134415 A1* | 5/2017 | Muddu | ............... | G06F 3/0484 |
| 2018/0004948 A1* | 1/2018 | Martin | ............... | H04L 63/1425 |

OTHER PUBLICATIONS

Boštjan Kaluža et al., Detection of Suspicious Behavior from a Sparse Set of Multiagent Interactions, Jun. 4, 2012, ACM, vol. 2, pp. 955-964. (Year: 2012).*

Yu Jin et al., Identifying and Tracking Suspicious Activities through IP Gray Space Analysis, Jun. 12, 2007, ACM, pp. 7-12. (Year: 2007).*

Lin Ying et al., The Design and Implementation of Host-based Intrusion Detection System, Apr. 22, 2010, IEEE, pp. 595-598. (Year: 2010).*

* cited by examiner

USER BEHAVIOR ANALYTICS FOR INSIDER THREAT DETECTION

TECHNICAL FIELD

Embodiments pertain to insider threat detection. Some embodiments relate to the use of file event monitoring for detection of suspicious activity on computing devices.

BACKGROUND

Convenience of access-to and storage-of data has grown. For example, large and bulky floppy disks that stored 3 megabytes of data have given way to tiny (Universal Serial Bus) USB thumb drives that store many gigabytes. Additionally, network technologies have become fast and convenient at accessing and transferring large amounts of data.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
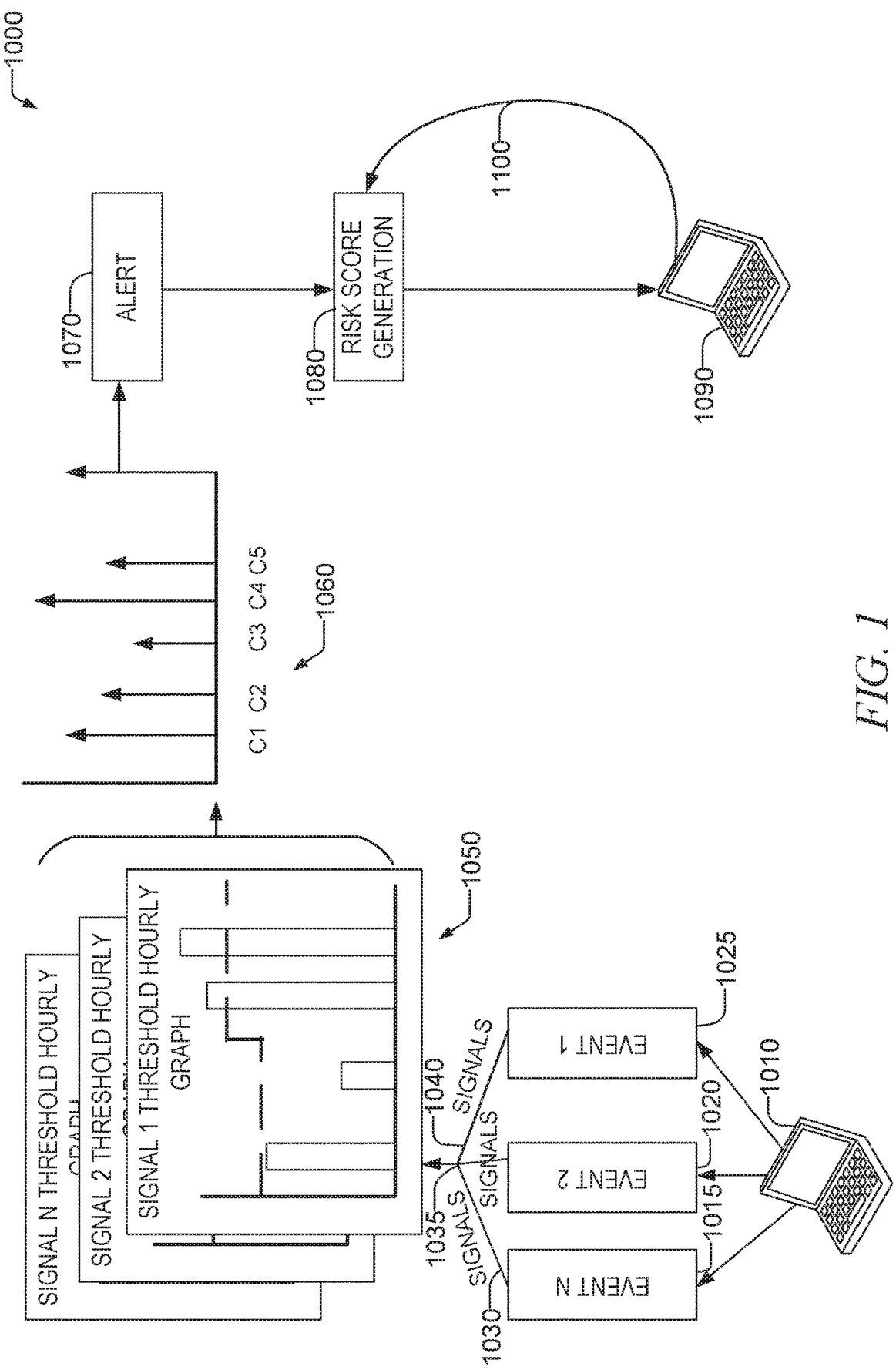
FIG. 1 shows a data flow diagram of an insider threat detection according to some examples of the present disclosure.

Computer data crime is a serious problem that has been exacerbated in recent years as methods of accessing sensitive data have grown easier. For example, individuals associated with an organization may utilize their access to the organization's computers to transfer large amounts of data out of the organization using small USB thumb drives. As another example, individuals may inappropriately access sensitive documents over a computer network from many miles away. Aside from document theft, wrongdoers may engage in other unwanted behavior, such as deleting documents, vandalizing documents, and the like. Insider threats may come from employees or other persons associated with an organization or may come from outsiders to the organizations who may have gained control of an insider's device through use of malware, viruses, hacks, social engineering and the like. These data crimes threaten to cost businesses billions of dollars in lost revenue, repair costs, and potentially government fines if consumer data is compromised. In addition, for government computer systems where sensitive files may be stored, a disclosure of those files may be very problematic to international relations. As used herein, a file system element is one of a directory (e.g., folder), file, link, or the like.

Disclosed in some examples are systems, methods, and machine readable mediums for identifying insider threats by determining file system element activity models that correlate to undesirable behavior and then utilizing those models to detect insider threats. Events involving file system elements of a client computing device (e.g., a network endpoint) may be monitored by a file system element monitoring application on the client computing device and reported to a threat detection system. The file system element monitoring application may monitor for events such as a file transfer over a USB interface, network file transfers, network logins, files uploaded into browsers, and the like. These events have corresponding signals that describe and give details about the events. A signal may comprise a type and a value. For example, signal types may include the number of files involved in the event, the number of bytes of the files involved in the event, the path of the files, and the like. Different events may have common signal types. For example, USB transfer events and network transfer events may both have a signal that identifies how many bytes were transferred.

For each signal type, the values of the signal for events within a predetermined time window are summed by the threat detection system for a particular client computing device. Thus, if during the predetermined time window two USB transfer events occurred, the number of bytes for the two events are summed to produce a total number of bytes transferred. A separate running sum is kept for each signal of each event type (e.g., a separate sum of bytes transferred via network transfer events is kept simultaneously). For each signal type, the summed signal value may be compared to a threshold. The threshold may be dynamic in that it may change from signal to signal, user to user, device to device, and hour to hour (e.g., thresholds may be lower during overnight hours). Each time a signal has a value over the threshold, an anomaly is recorded. Anomaly counts for each signal type are then summed over a second predetermined period of time. The anomaly counts for the various signal types are then weighted and summed to produce a risk score. The weights may be generated based upon a machine learning algorithm that learns which anomalies are more indicative of a threat. The risk score is presented to an administrator who then provides feedback to the risk score generator which is used to adjust the model.

In some examples, the file system element monitoring application may be a backup application that scans for changes in file system elements and uploads changed file system elements to a network-based backup system. In the case of the file system element monitoring application being a backup application, these events may already be reported to the backup system as part of the file system backup activities. In these examples, the backup system may be communicatively coupled, or integrated with the threat detection system.

Turning now to FIG. 1 a data flow diagram 1000 of an insider threat detection is shown according to some examples of the present disclosure. Client computing device 1010 may be a computing device with a file system element monitoring application that may detect one or more events, such as events 1015, 1020, and 1025. Events may include USB events, external device transfer events, events generated as a result of tiles uploaded to a browser, restores from a cloud computing platform, moving files to a cloud computing platform (e.g., BOX®, DROPBOX®), and the like. Events are generated in response to changes in the file system of the client computing device 1010. Each event may have a set of one or more corresponding signal types and values. Signal types and values (collectively "signals") are defined as properties of the event and may include such information as the number of bytes involved in the event, the number of file system elements involved in the event, and the like. Signals themselves may have metadata describing the signal such as the time it occurred, the user, and the like.

Signal sets are one or more signals. Signal set 1030 are signals generated by event N 1015, signal set 1035 are signals generated by event 2 1020, and signal set 1040 are signals generated by event 1 1025. The values for each signal type are summed across all events in a particular time period to produce a running total signal count for the particular time period (e.g., the last hour). For example, an event may have a signal that indicates how many bytes are transferred. The signal is aggregated such that the aggregate number of bytes transferred in a predetermined window of time (e.g., an hour) is determined. This aggregate is then compared with a threshold to determine if there is an anomaly. Thresholds may be dynamic in that they may change for every predetermined time period, every user, every signal, and the like, Some signals may not be inherently numerical. For example, one example signal may be a path to a file that is accessed. In these examples, the signal value that is summed may be a count of the number of times the file is accessed in the particular period of time. In some examples, file system elements may be grouped by function (e.g., sales, code, marketing, accounting). These types of signals may be useful for detecting users that are accessing files that they may not be expected to access. Combined with the dynamic thresholds this creates a powerful tool for monitoring for threats. For example, for a software developer, the threshold for accessing any document on sales may be set very low. Thus a low number of sales documents accessed may trigger an anomaly, As shown in FIG. 1, each signal may be visually represented as a graph 1050 with time as the X axis, and the sum of the signal values (across all events of a given type that occurred within the predetermined time period) on the Y axis. The threshold is represented by the dotted line. The ability of the threshold to vary based upon time is shown by the change in dotted line over time.

Once the aggregated value for a signal within a predetermined time period exceeds the threshold for that signal for that time period, the system generates an anomaly. Anomalies for a predetermined time window (e.g., the last hour, the last 12 hours, or the like) may be counted for each signal 1060. Each new anomaly then generates an alert 1070 if there is no existing alert for that signal type that has not been addressed by the network monitor. If there is an existing alert for that signal type, the anomaly count for the existing alert for that signal is updated. A new risk score also may be computed 1080. Risk scores may be computed as:

$$\Sigma w_i c_i$$

Where $w_i$ are weights and $C_i$ are the counts of anomalies for the ith signal type (since the trigger of alert for that signal). Thus, one way to compute the risk score is as a weighted summation of the anomaly counts.

The risk score may also be determined by a machine learning algorithm such as logistic regression that uses fields like, signal type, anomaly counts and time window span to generate signal importance probabilities/weights. The risk score may then be delivered to a network monitor's computing device 1090 as part of a Graphical User Interface (GUI). A network monitor may assess the situation and provide positive or negative feedback 1100 to indicate whether the risk is a real insider threat, or whether it is not. The risk score generator may then utilize this feedback to adjust the weights.

The thresholds and weights may be organization specific; that is, each organization may have their own learned model. in other examples, the thresholds and weights may be determined based upon anomaly count and network monitor feedback across multiple organizations. As actual attack training data may be rare, organizations that rely upon their own model may train their models with too much negative feedback, causing overfitting. By aggregating over multiple organizations the likelihood of including training data that includes positive examples (e.g., examples in which a real attack is occurring) increases. Additionally, to train the models, historical insider threat events from past insider threats and their event data may also be utilized.

Figure 2:
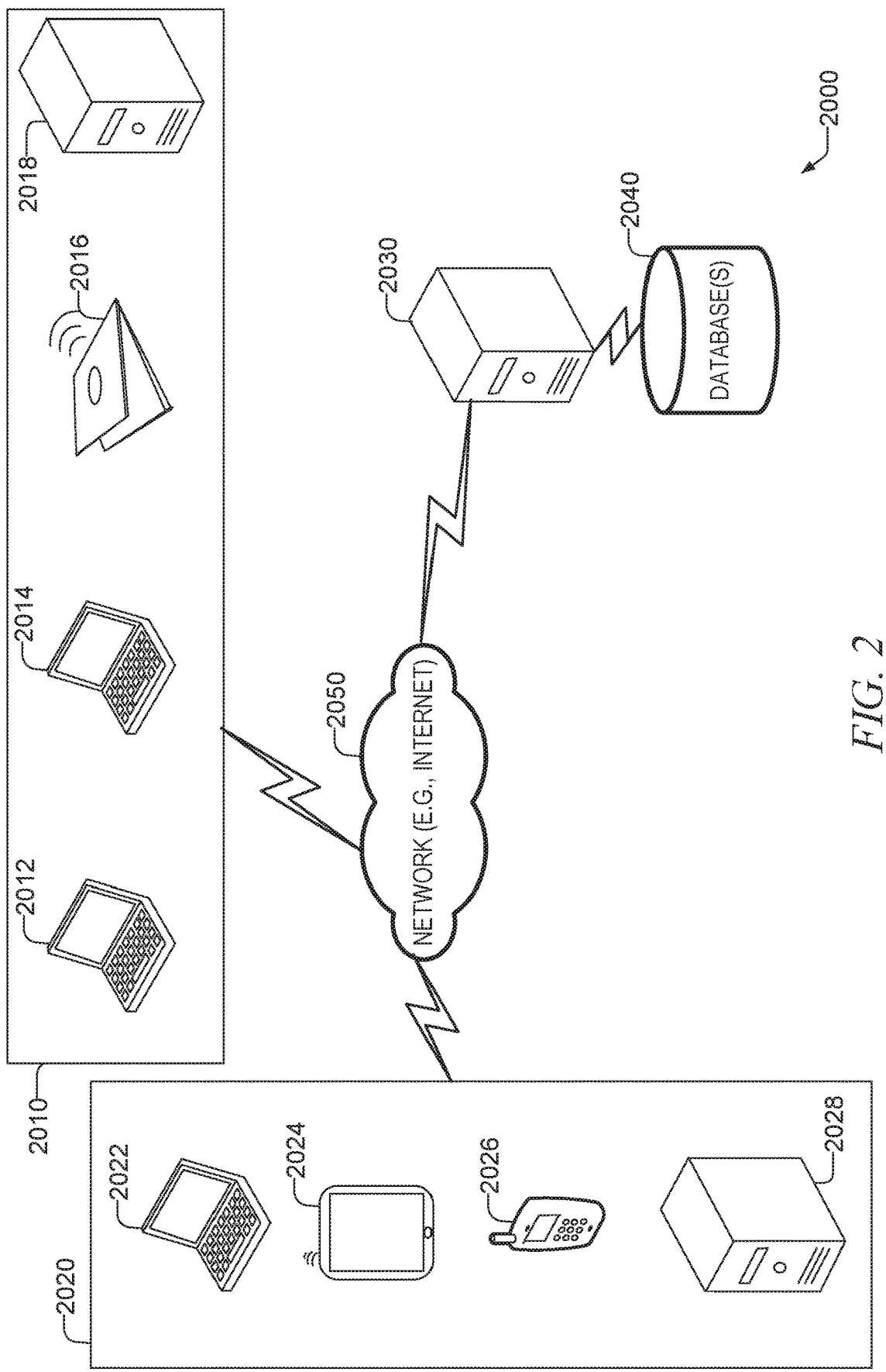
FIG. 2 shows a diagram of an insider threat detection system environment according to some examples of the present disclosure.

Turning now to FIG. 2 a diagram of an insider threat detection system environment 2000 is shown according to some examples of the present disclosure. Organizations 2020 and 2010 may be unaffiliated with each other and may represent a company, a university, or other large computer network run by a particular entity. Organizations 2010 and 2020 may be run by different entities. Organization 2020 may have client computing devices 2022, 2024, 2026 in the form of a laptop client computing device 2022, tablet client computing device 2024, and smartphone client computing device 2026. Network monitor computing device 2028 may be operated by a network monitor. Similarly, organization 2010 may have client computing devices 2012, 2014, 2016 in the form of laptop client computing devices 2012, 2014, and 2016. Network monitor computing device 2018 may be operated by a network monitor.

These devices may communicate with an insider threat detection service 2030 over a network, such as network 2050. Network 2050 may be a Local Area Network (LAN), a Wide Area Network (WAN), the Internet, or the like. Client computing devices 2022, 2024, 2026, 2012, 2014, and 2016 may backup one or more files and other file system elements to database 2040. For example, a file system element monitoring application executing on these client computing devices may monitor a file system on these devices and send any changes or events to the database 2040. In some examples, this may be facilitated by insider threat detection service 2030, in addition to insider threat detection. For example, the insider threat detection service 2030 may be communicatively coupled or otherwise associated with the backup service.

These file system element events may be analyzed by the insider threat detection service 2030 to determine when an anomaly is present and to determine what the current risk score is. The score and anomaly information for organization 2020 may be presented to network monitor computing device 2028 for the network monitor for organization 2020 and likewise the score and anomaly information for organization 2010 may be presented to network monitor computing device 2018 for the network monitor for organization 2010.

In FIG. 2, the organizations backed up their file system elements to database 2040 over a network, such as the Internet. In other examples, organizations may have databases that are private and restricted to their own organizations. In these examples, the insider threat detection service 2030 may be specific (and the model generated may be specific) to that organization. In some examples, the organization's files may be backed up to the private database, but the event information may be sent to an insider threat detection service 2030 that is separate from the backup service, thus taking advantage of a wider set of training data in providing the risk score.

Figure 3:
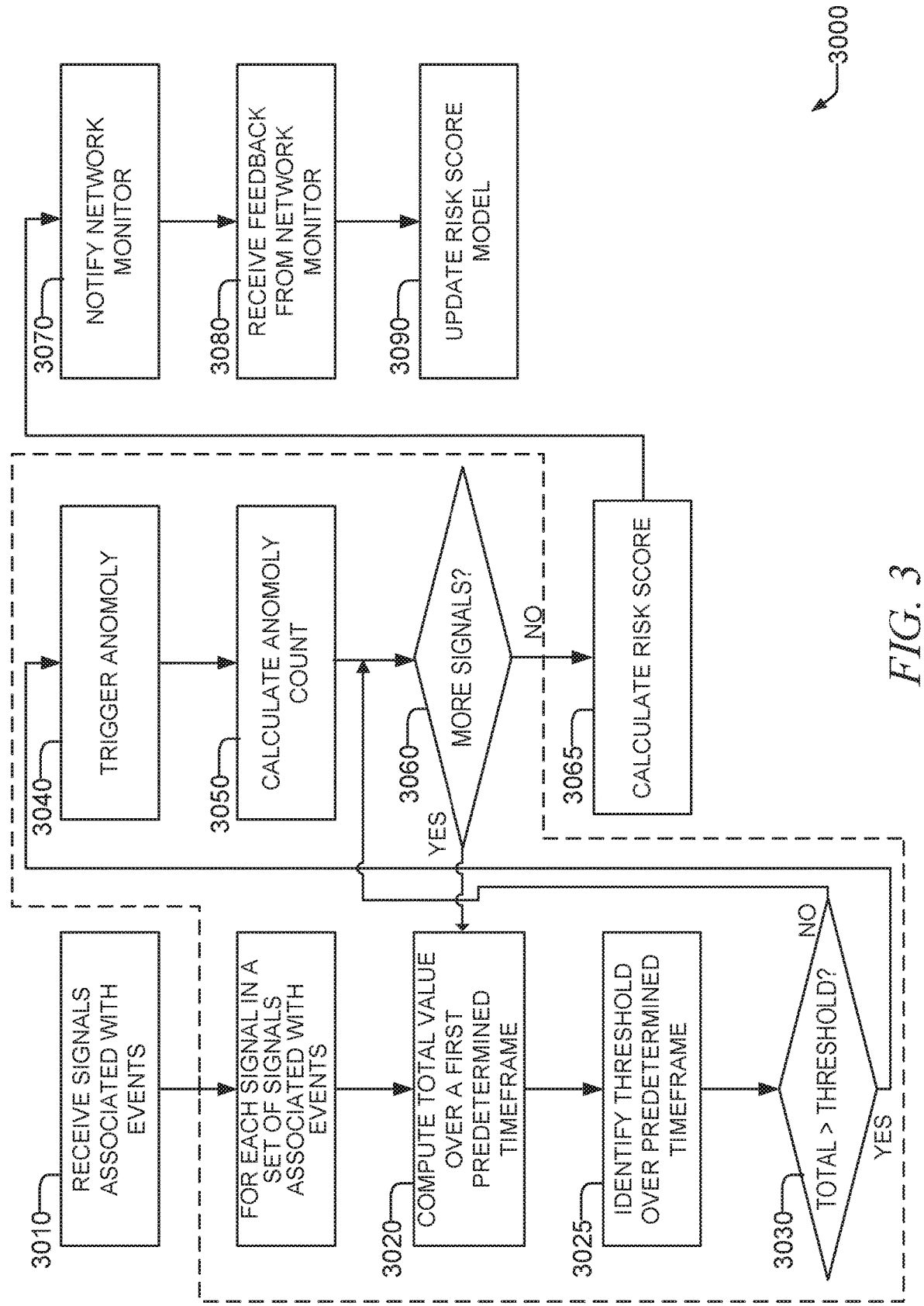
FIG. 3 shows a flowchart of a method of an insider threat detection according to some examples of the present disclosure.

Turning now to FIG. 3, a flowchart of a method 3000 of an insider threat detection is shown according to some examples of the present disclosure. At operation 3010 the threat detection system may receive signals associated with one or more events. As previously described, events may include file system element transfer events to a USB device, file system element transfer events to a cloud drive (e.g., DROPBOX®, BOX®, or the like) of the user, file system element deletion events, file system element copy events, file system element move events, file system element modification events, and the like. Each event may have a number of signals that describe information about the event. Signals may include the number of file system elements (e.g., 10 files) involved in the event, total size of file system elements (e.g., in bytes) involved in the event, file types that were moved in the event, a storage system path to the file (e.g., C:\Home"), and the like.

The operations of 3020-3060 may be performed for each signal in a set of signals received at operation 3010. In some examples, the set of signals may be all the signals received at operation 3010, in other examples, the set of signals may be a subset of the signals received at operation 3010. The insider threat detection system may convert the signal into a numerical value—for example, the signal specifying a path may be utilized as a separate signal and the numerical value is a count of the number of times that path was accessed. Stated differently, each file system element itself may be a signal and may have a counter associated with it that indicates how many times that file system element was the subject of an event.

At operation 3020 the system may compute the total value of the signal across events of a given type over a first predetermined time frame. An example predetermined time frame is an hour. Thus, in some examples, operation 3020 computes the aggregate value for the signal for an hour. If the signal is a byte count of bytes transferred to a USB drive, then at operation 3020 the system calculates a total number of bytes transferred to a USB drive over the past hour.

At operation 3025 the system may determine the threshold over the predetermined timeframe. The threshold may be static (e.g., each predetermined timeframe has the same threshold), or may be dynamic—that is, it may vary with time. For example, during the daytime it would typically be normal for a higher volume of data transfers than in the middle of the night. Thus, a higher threshold for signals in the daytime might be more appropriate than at night time to avoid false alarms. In some examples, the thresholds are determined by an administrator (or network monitor). In other examples, the thresholds may be learned by the system. For example, the system may utilize past behaviors observed by the system to learn a threshold for each signal for each predetermined time period (and, in some examples, of each user). For example, using training data and manual labels to indicate normal or abnormal behavior, the system may utilize a machine learning algorithm to learn the thresholds. The models utilized may be global (e.g., across multiple organizations), specific to an organization, specific to a department, group, or class of users (e.g., developers may have different thresholds than others), and the like. Additionally, since each individual file system element is also a signal, each individual file system element, or group of file system elements, may have its own model with its own threshold. Combining these, it is possible to have certain file system elements have certain thresholds for certain groups of users. For example, the threshold for file accesses for code files may be high for developers, but a threshold for accessing a management document may be very low. This may allow organizations to tailor the threat detection based upon user roles and document purpose. In order to facilitate this, the documents may be categorized or grouped and users may have associated groups.

At operation 3030 a determination is made whether the total signal value is greater than the threshold. If the total signal value is not greater than the threshold, processing continues with operation 3060. If the total signal value is greater than the threshold, an anomaly is triggered at operation 3040. At operation 3050 the anomaly count for a second period of time (e.g., a day) is calculated. If there are more signals at operation 3060 processing returns to operation 3020. If there are no more signals in the set of signals then at operation 3065 a risk score is calculated. For example, the risk scores may be a weighted summation of the anomaly counts, where the weights are a machine learned model produced by a machine learning model such as a logistic regression model. At operation 3070, a network monitor may be notified of the risk score. In some examples, the network monitor may be constantly updated as to the current risk score. In other examples, the network monitor is only notified once the risk score goes above a predetermined threshold.

At operation 3080 the network monitor may provide the system feedback. For example, the network monitor may indicate that there is no threat. This feedback may then be utilized as negative examples (along with the anomaly scores) to refine the weights through the use of a logistic regression algorithm. In other examples, the network monitor may indicate that there is a threat. This feedback may be used as positive examples (along with the anomaly scores) to refine the thresholds and weights through the use of a logistic regression algorithm. At operation 3090 the positive or negative feedback is then used to update the risk score model (e.g., the logistic regression probabilities/weights), While the operations in FIG. 3 are shown as happening sequentially, in other examples, one or more of the operations may be performed in parallel. For example, after the anomaly count is generated, the risk score may be modified and in parallel the system may look for more signals and notify the network monitor.

Figure 4:
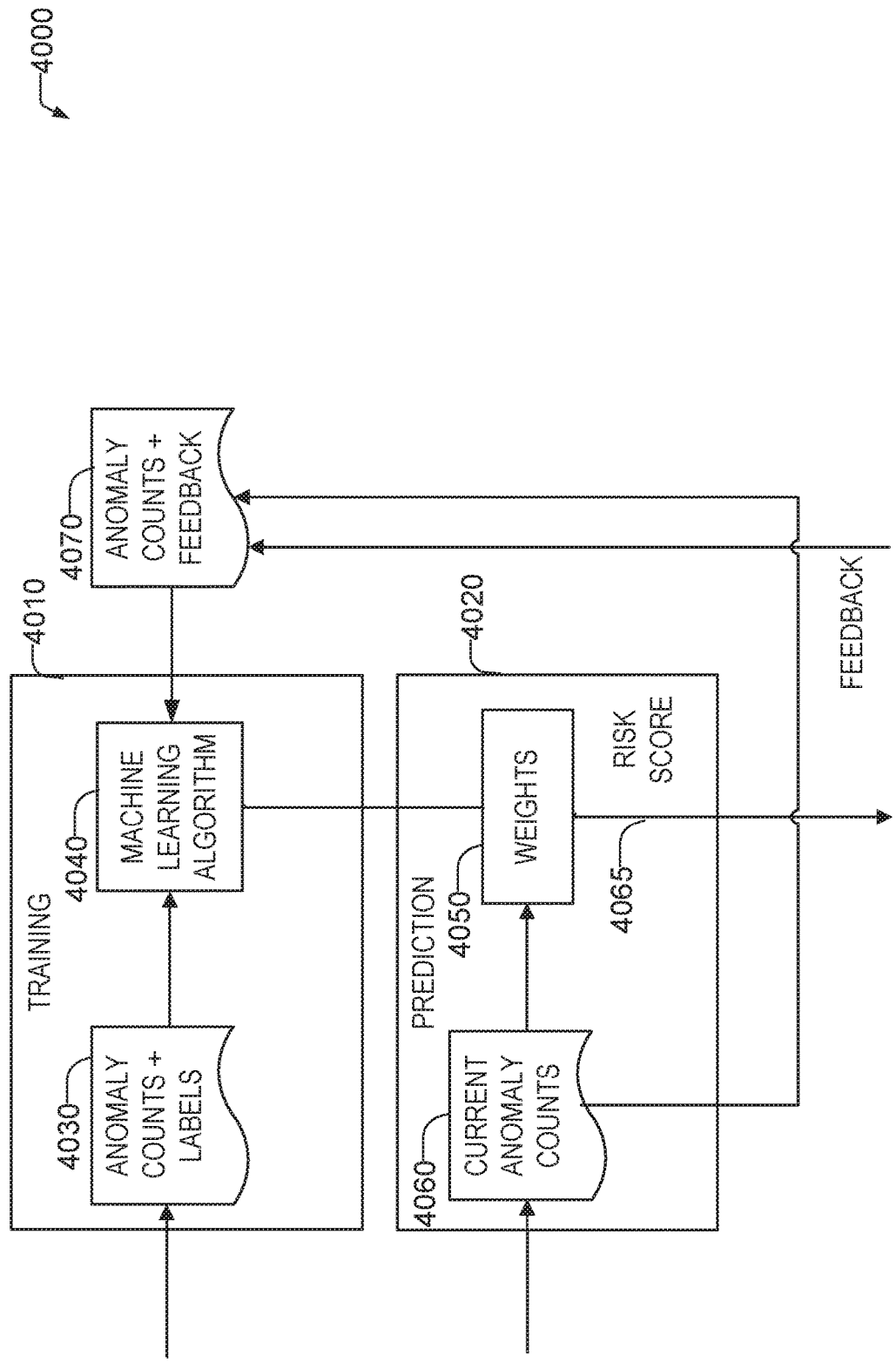
FIG. 4 shows an example machine learning module according to some examples of the present disclosure.

FIG. 4 shows an example machine learning module 4000 according to some examples of the present disclosure. Machine learning module 4000 is one example method of calculating a risk score at operation 3065 of FIG. 3, Machine learning module 4000 utilizes a training module 4010 and a prediction module 4020. Training module 4010 takes as inputs historical anomaly counts and labels 4030. The label may be whether or not the anomaly counts indicates suspicious activity. The machine learning algorithm 4040 produces weights 4050 based upon the anomaly counts and labels 4030.

In the prediction module 4020, the currently observed anomaly counts 4060 are multiplied by the corresponding weight from weights 4050 and summed to produce a risk score 4065. The training module 4010 may operate in an offline manner to train the weights 4050. The prediction module 4020, however, may be designed to operate in an online manner. It should be noted that the weights 4050 may be periodically updated via additional training and/or user feedback. For example, the current anomaly counts 4060 may be labelled with feedback from a network monitor 4070. This may be utilized by the machine learning algorithm 4040 to update and refine the weights 4050.

The machine learning algorithm 4040 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAD), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck methods. Unsupervised models may not have a training module 4010.

Figure 5:
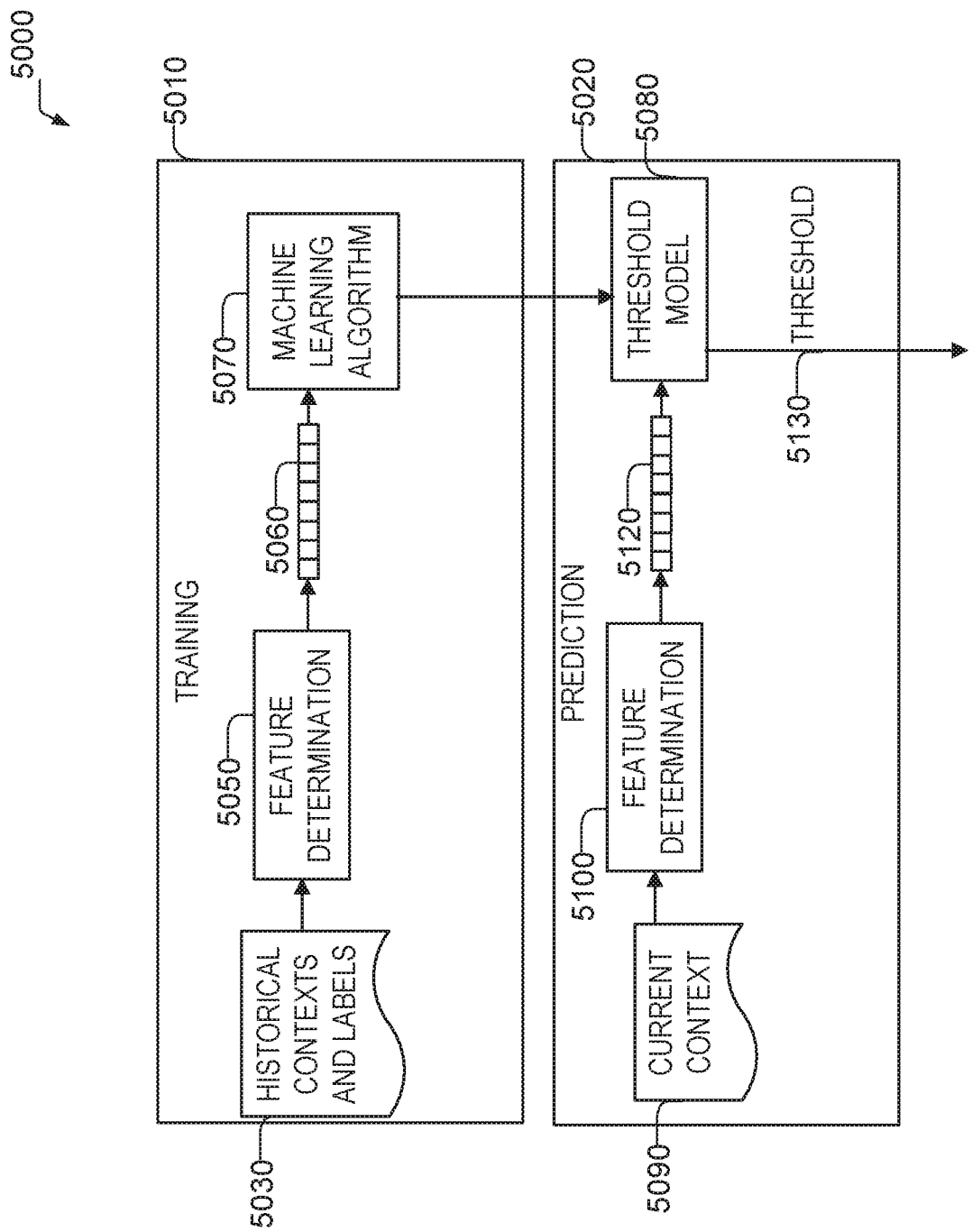
FIG. 5 shows an example machine learning module for calculating signal thresholds according to some examples of the present disclosure.

FIG. 5 shows an example machine learning module 5000 for calculating signal thresholds according to some examples of the present disclosure. As previously described, the thresholds for each signal may he calculated based upon historical mean, median, and other historical statistics. In other examples, a machine learning algorithm may be utilized to calculate thresholds. Machine learning module 5000 utilizes a training module 5010 and a prediction module 5020. Training module 5010 inputs historical context information 5030 into feature determination module 5050. Example historical contexts includes one or more of: the value of the signal, the time of the signal, information on the user of the client computing device (such as the department the user is employed in), the month, the date, the location of the user, the device of the user, a device type of the user, and the like. The historical context information 5030 may be labeled indicating whether the signal level is considered suspicious given the context.

Feature determination module 5050 determines one or more features 5060 from this information. Features 506( )are a set of the information input and is information determined to be predictive of whether or not a particular signal is suspicious. In some examples, the features 5060 may be all the historical contexts and labels. The machine learning algorithm 5070 produces a threshold model 5080 based upon the features 5060 and the label.

In the prediction module 5020, the current context 5090 may be input to the feature determination module 5100. Feature determination module 5100 may determine the same set of features or a different set of features as feature determination module 5050. In some examples, feature determination modules 5100 and 5050 are the same module. Feature determination module 5100 produces feature vector 5120, which are input into the threshold model 5080 to generate a threshold 5130. The training module 5010 may operate in an offline manner to train the threshold model 5080. The prediction module 5020, however, may be designed to operate in an online manner. It should be noted that the threshold model 5080 may be periodically updated via additional training and/or user feedback.

The machine learning algorithm 5070 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C4.5, Classification and Regression Tree (CART), Chi-squared Automatic Interaction Detector (CHAM), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck methods. Unsupervised models may not have a training module 5010.

Figure 6:
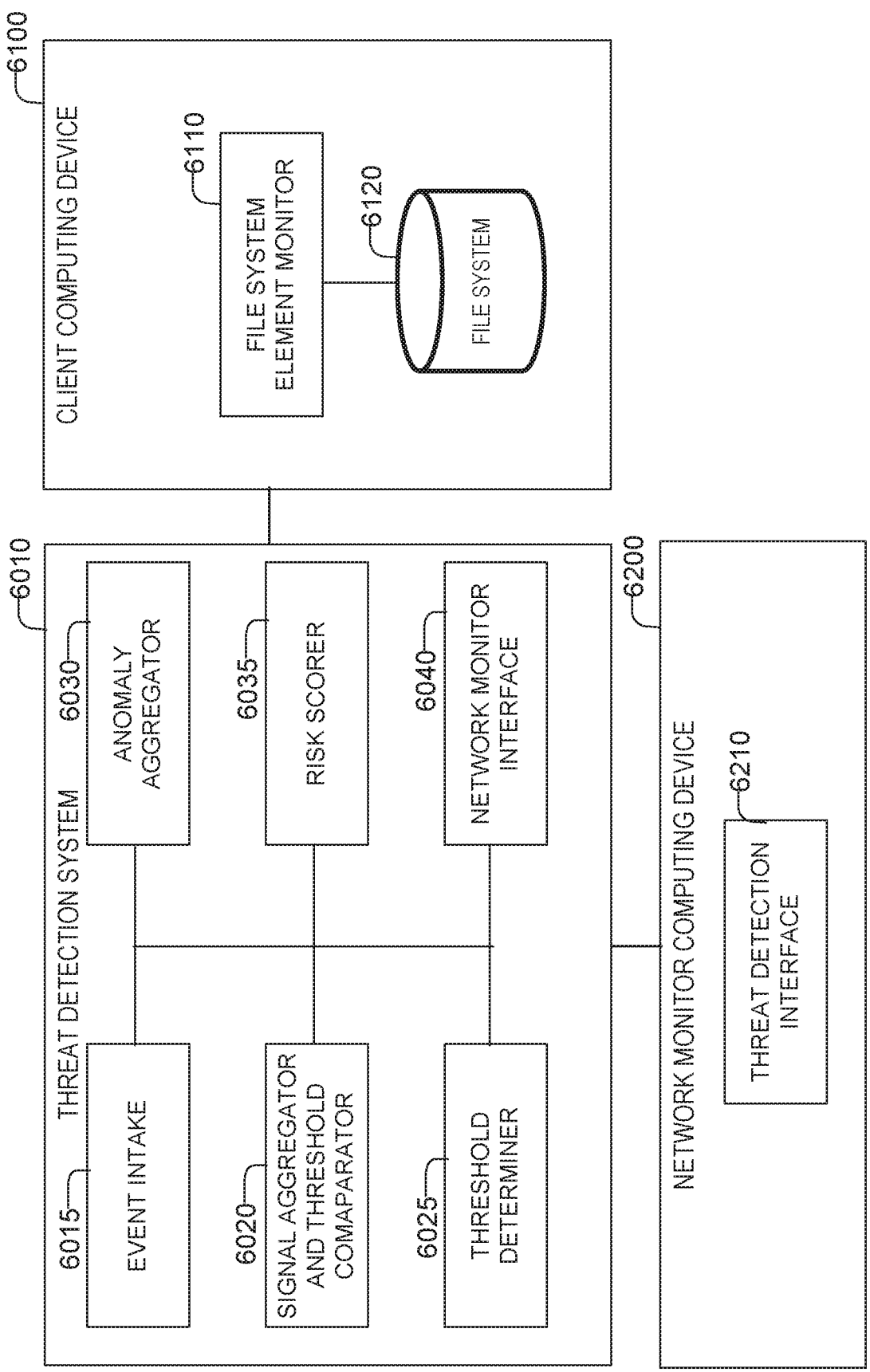
FIG. 6 shows a threat detection system according to some examples of the present disclosure.

Turning now to FIG. 6 a threat detection system 6010 is shown according to some examples of the present disclosure. Event intake 6015 communicates with a client computing device 6100 to receive events and associated signals generated by a file system element monitor 6110 for file system 6120. In some examples, the event intake 6015 may communicate directly with the file system element monitor 6110 of the client computing device 6100; in other examples, the event intake 6015 may communicate with other components of a file system element backup system. For example, the file system element monitor 6110 of the client computing device 6100 may communicate with a backup service or component, which may pass file system element events to the event intake 6015.

Signal aggregator and threshold comparator 6020 may sum all received signals of the same type (and convert signals to numerical values if necessary) for a predetermined period of time (e.g., an hour). The signal aggregator and threshold comparator 6020 may receive a threshold from the threshold determiner 6025 for each signal. Threshold determiner 6025 may determine the threshold based upon the context of the signals (e.g., the time of day, the user, the device, and the like), based upon a predetermined threshold (that may be set based upon historical information) and the like Signal aggregator and threshold comparator 6020 may generate an anomaly if the aggregate is above the threshold for a particular signal.

Anomaly aggregator 6030 may receive anomaly notifications from the signal aggregator and threshold comparator 6020 and may aggregate the anomalies for each signal for a second predetermined period of time. Risk scorer 6035 may utilize the aggregated anomaly counts from anomaly aggregator 6030 to calculate a risk score (for example, by utilizing a weighted sum of the anomaly counts). In other examples, the anomaly counts, as well as other context information, may be input into a machine learning algorithm to produce the risk score. Network monitor interface 6040 may communicate the risk score with a threat detection interface 6210 on network monitor computing device 6200, A network monitor or other administrator may provide feedback on the risk score, which may be sent back to network monitor interface 6040 via threat detection interface 6210. The risk scorer 6035 may be responsible for building and maintaining machine learning models for calculating the risk score and may utilize the feedback to update the models.

The components of FIG. 6 are exemplary and one of ordinary skill in the art with the benefit of the present disclosure will appreciate that other organizations are possible. For example, one or more of the components of FIG. 6 may be combined and one or more components of FIG. 6 may be separated into multiple components. Additionally, the exact placement of the components may be changed. For example, one or more of the components of FIG. 6 may be executed by a different machine or a different system than that shown.

Figure 7:
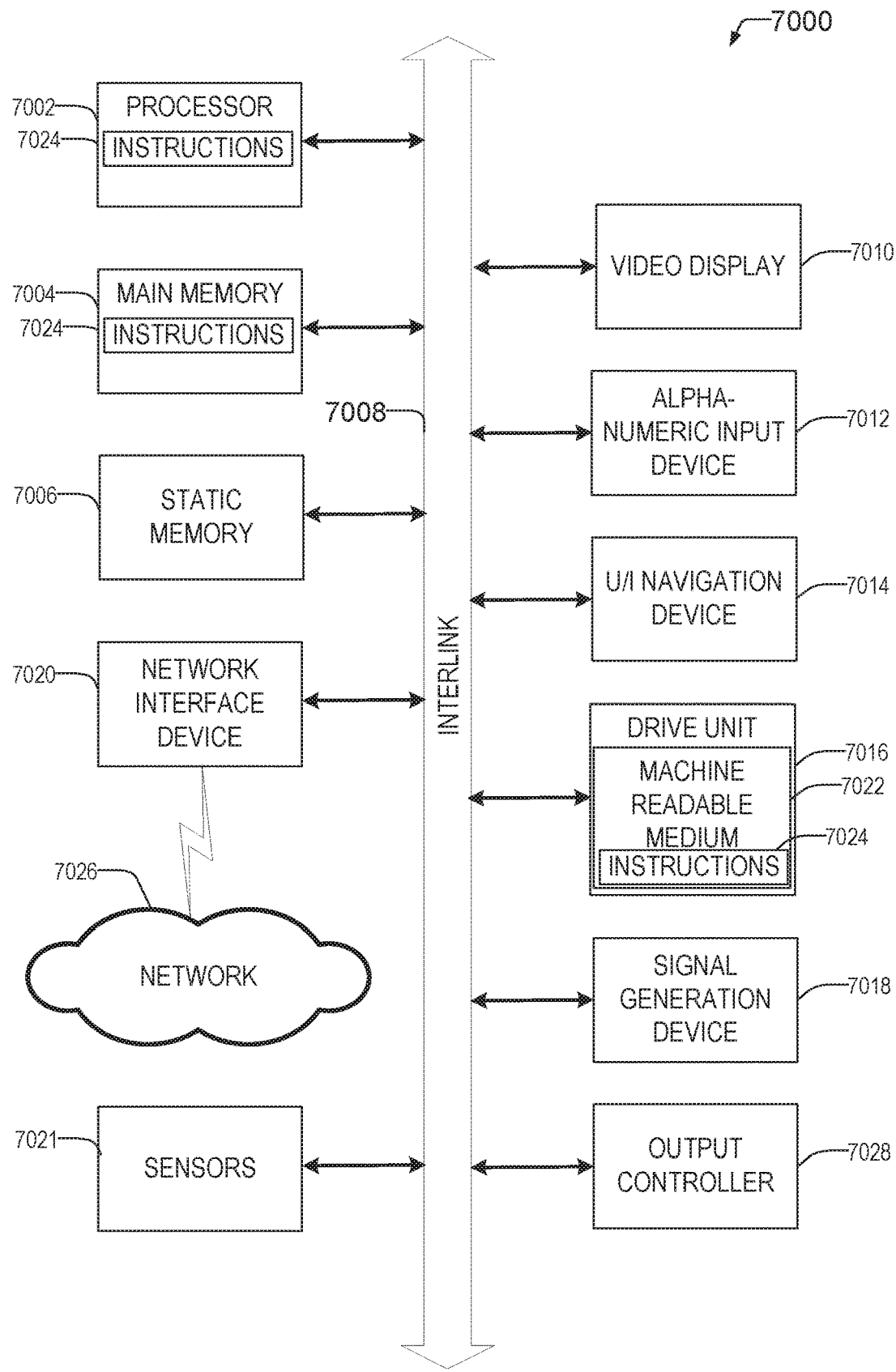
FIG. 7 illustrates a block diagram of an example machine upon which any one or more of the techniques (e.g., methodologies) discussed herein may perform.

FIG. 7 illustrates a block diagram of an example machine 7000 upon which any one or more of the techniques (e.g., methodologies) discussed herein may perform. In alternative embodiments, the machine 700( )may operate as a stand-alone device or may be connected (e.g., networked) to other machines. In a networked deployment, the machine 7000 may operate in the capacity of a server machine, a client machine, or both in server-client network environments. In an example, the machine 7000 may act as a peer machine in peer-to-peer (P2P) (or other distributed) network environment. The machine 7000 may be a server computer, a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, the machine 7000 may implement the threat detection system 6010, the computing device endpoint 6100, the network monitor computing device 6200, or the like. Machine 7000 may implement (in whole or in part) the flow of FIG. 1, one or more of the computing devices or organizations in FIG, 2, the method of FIG. 3, and the machine learning of FIGS. 4 and 5. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (termed "modules"). For example, the components of FIG. 6. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 7000 may include a hardware processor 7002 (e.g., a central processing unit (CPU), a graphics processing unit (GPU), a hardware processor core, or any combination thereof), a main memory 7004 and a static memory 7006, some or all of which may communicate with each other via an interlink (e.g., bus) 7008. The machine 7000 may further include a display unit 7010, an alphanumeric input device 7012 (e.g., a keyboard), and a user interface (UI) navigation device 7014 (e.g., a mouse). In an example, the display unit 7010, input device 7012 and UI navigation device 7014 may be a touch screen display. The machine 7000 may additionally include a storage device (e.g., drive unit) 7016, a signal generation device 7018 (e.g., a speaker), a network interface device 7020, and one or more sensors 7021, such as a global positioning system (GPS) sensor, compass, accelerometer, or other sensor. The machine 7000 may include an output controller 7028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 7016 may include a machine readable medium 7022 on which is stored one or more sets of data structures or instructions 7024 (e.g., software) embodying or utilized by any one or more of the techniques or functions described herein. The instructions 7024 may also reside, completely or at least partially, within the main memory 7004, within static memory 7006, or within the hardware processor 7002 during execution thereof by the machine 7000. In an example, one or any combination of the hardware processor 7002, the main memory 7004, the static memory 7006, or the storage device 7016 may constitute machine readable media.

While the machine readable medium 7022 is illustrated as a single medium, the term "machine readable medium" may include a single medium or multiple media (e.g., a centralized or distributed database, and/or associated caches and servers) configured to store the one or more instructions 7024.

The term "machine readable medium" may include any medium that is capable of storing, encoding, or carrying instructions for execution by the machine 7000 and that cause the machine 7000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 7024 may further be transmitted or received over a communications network 7026 using a transmission medium via the network interface device 7020. The Machine 7000 may communicate with one or more other machines utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 7020 may include one or more physical jacks (e.g., Ethernet, coaxial, or phone jacks) or one or more antennas to connect to the communications network 7026. In an example, the network interface device 7020 may include a plurality of antennas to wirelessly communicate using at least one of single-input multiple-output (SIMO), multiple-input multiple-output (MIMO), or multiple-input single-output (MISO) techniques. In some examples, the network interface device 7020 may wirelessly communicate using Multiple User MIMO techniques.

OTHER NOTES AND EXAMPLES

The follow are non-limiting examples.

Example 1 is a method for detecting electronic threats, the method comprising: receiving a signal associated with a file system element event from a computing device endpoint, the signal describing a characteristic of the file system element event; summing a value of the signal with a value of a second signal to create a summed signal, the signal and the second signal comprising a same type of signal, the signal and the second signal both received within a first predetermined period of time; identifying a threshold for the value of the summed signal; determining that the value of the summed signal exceeds the threshold, and in response, triggering a first anomaly of a first type; calculating a count of a number of anomalies of the first type; calculating a risk score based upon the count and a second count corresponding to a second anomaly of a second type, the first and second anomalies occurring within a second predetermined period of time, the risk score quantifying a calculated risk that the computing device endpoint is a threat; and sending the risk score to a second computing device.

In Example 2, the subject matter of Example 1 optionally includes wherein calculating the risk score based upon the count and the second count comprises: multiplying the count by a first weight to produce a first weighted anomaly count; multiplying the second count by a second weight to produce a second weighted anomaly count; and adding the first weighted anomaly count to the second weighted anomaly count to calculate the risk score.

In Example 3, the subject matter of Example 2 optionally includes wherein the first and second weights are calculated by a machine learning algorithm.

In Example 4, the subject matter of Example 3 optionally includes wherein the machine learning algorithm is a regression algorithm trained using historical anomaly counts labelled manually.

In Example 5, the subject matter of any one or more of Examples 3-4 optionally include receiving feedback from the second computing device, the feedback indicating whether there is a threat, and in response, adjusting the weights based upon the feedback.

In Example 6, the subject matter of any one or more of Examples 1-5 optionally include wherein the threshold for the value of the summed signal is based upon a time during which the signal was generated.

In Example 7, the subject matter of any one or more of Examples 1-6 optionally include wherein identifying the threshold comprises determining the threshold based upon context information of the computing device endpoint.

Example 8 is a system for detecting electronic threats, the system comprising: a processor; a memory communicatively coupled to the processor and comprising instructions, which cause the processor to perform operations comprising: receiving a signal associated with a file system element event from a computing device endpoint, the signal describing a characteristic of the file system element event; summing a value of the signal with a value of a second signal to create a summed signal, the signal and the second signal comprising a same type of signal, the signal and the second signal both received within a first predetermined period of time; identifying a threshold for the value of the summed signal; determining that the value of the summed signal exceeds the threshold, and in response, triggering a first anomaly of a first type; calculating a count of a number of anomalies of the first type; calculating a risk score based upon the count and a second count corresponding to a second anomaly of a second type, the first and second anomalies occurring within a second predetermined period of time, the risk score quantifying a calculated risk that the computing device endpoint is a threat; and sending the risk score to a second computing device.

In Example 9, the subject matter of Example 8 optionally includes wherein the operations of calculating the risk score based upon the count and the second count comprises: multiplying the count by a first weight to produce a first weighted anomaly count; multiplying the second count by a second weight to produce a second weighted anomaly count; and adding the first weighted anomaly count to the second weighted anomaly count to calculate the risk score.

In Example 10, the subject matter of Example 9 optionally includes wherein the first second weights are calculated by a machine learning algorithm.

In Example 11, the subject matter of Example 10 optionally includes wherein the machine learning algorithm is a regression algorithm trained using historical anomaly counts labelled manually.

In Example 12, the subject matter of any one or more of Examples 10-11 optionally include wherein the operations further comprise: receiving feedback from the second computing device, the feedback indicating whether there is a threat, and in response, adjusting the weights based upon the feedback.

In Example 13, the subject matter of any one or more of Examples 8-12 optionally include wherein the threshold for the value of the summed signal is based upon a time during which the signal was generated.

In Example 14, the subject matter of any one or more of Examples 8-13 optionally include wherein identifying the threshold comprises determining the threshold based upon context information of the computing device endpoint.

Example 15 is a non-transitory machine readable medium comprising instructions, which when executed by a machine, causes the machine to perform operations comprising: receiving a signal associated with a file system element event from a computing device endpoint, the signal describing a characteristic of the file system element event; summing a value of the signal with a value of a second signal to create a summed signal, the signal and the second signal comprising a same type of signal, the signal and the second signal both received within a first predetermined period of time; identifying a threshold for the value of the summed signal; determining that the value of the summed signal exceeds the threshold, and in response, triggering a first anomaly of a first type; calculating a count of a number of anomalies of the first type; calculating a risk score based upon the count and a second count corresponding to a second anomaly of a second type, the first and second anomalies occurring within a second predetermined period of time; the risk score quantifying a calculated risk that the computing device endpoint is a threat; and sending the risk score to a second computing device.

In Example 16, the subject matter of Example 15 optionally includes wherein the operations of calculating the risk score based upon the count and the second count comprises: multiplying the count by a first weight to produce a first weighted anomaly count; multiplying the second count by a second weight to produce a second weighted anomaly count; and adding the first weighted anomaly count to the second weighted anomaly count to calculate the risk score.

In Example 17, the subject matter of Example 16 optionally includes wherein the first and second weights are calculated by a machine learning algorithm.

In Example 18, the subject matter of Example 17 optionally includes wherein the machine learning algorithm is a regression algorithm trained using historical anomaly counts labelled manually.

In Example 19, the subject matter of any one or more of :Examples 17-18 optionally include wherein the operations further comprise: receiving feedback from the second computing device, the feedback indicating whether there is a threat, and in response, adjusting the weights based upon the feedback.

In Example 20, the subject matter of any one or more of Examples 15-19 optionally include wherein the threshold for the value of the summed signal is based upon a time during which the signal was generated.

In Example 21, the subject matter of any one or more of Examples 15-20 optionally include wherein identifying the threshold comprises determining the threshold based upon context information of the computing device endpoint.

Example 22 is a device for detecting electronic threats, the device comprising: means for receiving a signal associated with a file system element event from a computing device endpoint, the signal describing a characteristic of the file system element event; means for summing a value of the signal with a value of a second signal to create a summed signal, the signal and the second signal comprising a same type of signal, the signal and the second signal both received within a first predetermined period of time; means for identifying a threshold for the value of the summed signal; means for determining that the value of the summed signal exceeds the threshold, and in response, triggering a first anomaly of a first type; means for calculating a count of a number of anomalies of the first type; means for calculating a risk score based upon the count and a second count corresponding to a second anomaly of a second type, the first and second anomalies occurring within a second predetermined period of time, the risk score quantifying a calculated risk that the computing device endpoint is a threat; and means for sending the risk score to a second computing device.

In Example 23, the subject matter of Example 22 optionally includes wherein the means for calculating the risk score based upon the count and the second count comprises: means for multiplying the count by a first weight to produce a first weighted anomaly count; means for multiplying the second count by a second weight to produce a second weighted anomaly count; and means for adding the first weighted anomaly count to the second weighted anomaly count to calculate the risk score, In Example 24, the subject matter of Example 23 optionally includes wherein the first and second weights are calculated by a machine learning algorithm.

In Example 25, the subject matter of Example 24 optionally includes wherein the machine learning algorithm is a regression algorithm trained using historical anomaly counts labelled manually.

In Example 26, the subject matter of any one or more of Examples 24-25 optionally include means for receiving feedback from the second computing device, the feedback indicating whether there is a threat, and in response, adjusting the weights based upon the feedback.

In Example 27. the subject matter of any one or more of Examples 22-26 optionally include wherein the threshold for the value of the summed signal is based upon a time during which the signal was generated.

In Example 28, the subject matter of any one or more of Examples 22-27 optionally include wherein the means for identifying the threshold comprises means for determining the threshold based upon context information of the computing device endpoint.

What is claimed is:

1. A method for detecting inappropriate access of files by an authori ted user of a client computing device, the method comprising:
    receiving a first file system element event indicator from an application executing on the client computing device, the first file system element event described by the first file system element event indicator including a first value and a first type, the first value being a number of bytes corresponding to the first file system element event, the first type being a deletion event, copy event, move event, or modification event;
    summing the first value with a second value of a second file system element event of the first type to create a summed value, the first file system element event and the second file system element event both received within a first predetermined period of time;
    determining a threshold for the summed value, the threshold determined based upon past observations of values of other file system element events of the first type during a past time period, a class of the user within an organization, and a function classification of files corresponding to the file system element events, the past time period prior to the first predetermined period of time;
    determining that the summed value exceeds the threshold, and in response, incrementing a first anomaly counter of a first type, the first type of anomaly selected based upon the first type of event;
    calculating a count of a number of generated anomaly indicators of the first type;
    calculating a risk score based upon the count and a second count corresponding to a number of generated anomaly indicators corresponding to second anomalies of a second type, the first and second anomalies occurring within a second predetermined period of time, the risk score quantifying a calculated risk that the authorized user of the client computing device has engaged in inappropriate access of files; and
    sending the risk score to a second computing device for display on a graphical user interface (GUI).

2. The method of claim 1, wherein calculating the risk score based upon the count and the second count comprises:
    multiplying the count by a first weight to produce a first weighted anomaly count;
    multiplying the second count by a second weight to produce a second weighted anomaly count; and
    adding the first weighted anomaly count to the second weighted anomaly count to calculate the risk score.

3. The method of claim 2, wherein the first and second weights are calculated by a machine learning algorithm.

4. The method of claim 3, wherein the machine learning algorithm is a regression algorithm trained using historical anomaly counts labelled manually.

5. The method of claim 3, further comprising:
receiving feedback from the second computing device, the feedback indicating whether there is a threat, and in response, adjusting the weights based upon the feedback.

6. The method of claim 1, wherein the threshold for the summed value is based upon a time during which the first and second events were generated.

7. The method of claim 1, wherein identifying the threshold comprises determining the threshold based upon context information of the client computing device.

8. A system for detecting inappropriate access of files by an authorized user of a client computing device, the system comprising:
a processor:
a memory communicatively coupled to the processor and comprising instructions, which cause the processor to perform operations comprising:
receiving a first file system element event indicator from an application executing on the client computing device, the first file system element event described by the first file system element event indicator including a first value and a first type, the first value being a number of bytes corresponding to the first file system element event, the first type being a deletion event, copy event, move event, or modification event;
summing the first value with a second value of a second file system element event of the first type to create a summed value, the first file system element event and the second file system element event both received within a first predetermined period of time;
determining a threshold for the summed value, the threshold determined based upon past observations of values of other file system element events of the first type during a past time period, a class of the user within an organization. and a function classification of files corresponding to the file system element events, the past time period prior to the first predetermined period of time;
determining that the summed value exceeds the threshold, and in response, incrementing a first anomaly counter of a first type, the first type of anomaly selected based upon the first type of event;
calculating a count of a number of generated anomaly indicators of the first type;
calculating a risk score based upon the count and a second count corresponding to a number of generated anomaly indicators corresponding to second anomalies of a second type, the first and second anomalies occurring within a second predetermined period of time, the risk score quantifying a calculated risk that the authorized user of the client computing device has engaged in inappropriate access of files; and
sending the risk score to a second computing device for display on a graphical user interface (GUI).

9. The system of claim 8, wherein the operations of calculating the risk score based upon the count and the second count comprises:
multiplying the count by a first weight to produce a first weighted anomaly count;
multiplying the second count by a second weight to produce a second weighted anomaly count; and
adding the first weighted anomaly count to the second weighted anomaly count to calculate the risk score.

10. The system of claim 9, wherein the first and second weights are calculated by a machine learning algorithm.

11. The system of claim 10, wherein the machine learning algorithm is a regression algorithm trained using historical anomaly counts labelled manually.

12. The system of claim 10, wherein the operations further comprise:
receiving feedback from the second computing device, the feedback indicating whether there is a threat, and in response, adjusting the weights based upon the feedback.

13. The system of claim 8, wherein the threshold for the summed value is based upon a time during which the first and second events were generated.

14. The system of claim 8, wherein identifying the threshold comprises determining the threshold based upon context information of the client computing device.

15. A non-transitory machine readable medium comprising instructions for detecting inappropriate access of files by an authorized user of a client computing device, the instructions, which when executed by a machine, causes the machine to perform operations comprising:
receiving a first file system element event indicator from an application executing on the client computing device, the first file system element event described by the first file system element event indicator including a first value and a first type, the first value being a number of bytes corresponding to the first file system element event, the first type being a deletion event, copy event, move event, or modification event;
summing the first value with a second value of a second file system element event of the first type to create a summed value, the first file system element event and the second file system element event both received within a first predetermined period of time;
determining a threshold for the summed value, the threshold determined based upon past observations of values of other file system element events of the first type during a past time period, a class of the user within an organization, and a function classification of files corresponding to the file system element events, the past time period prior to the first predetermined period of time;
determining that the summed value exceeds the threshold, and in response, incrementing a first anomaly counter of a first type, the first type of anomaly selected based upon the first type of event;
calculating a count of a number of generated anomaly indicators of the first type;
calculating a risk score based upon the count and a second count corresponding to a number of generated anomaly indicators corresponding to second anomalies of a second type, the first and second anomalies occurring within a second predetermined period of time, the risk score quantifying a calculated risk that the authorized user of the client computing device has engaged in inappropriate access of files; and
sending the risk score to a second computing device for display on a graphical user interface (GUI).

16. The non-transitory machine readable medium of claim 15, wherein the operations of calculating the risk score based upon the count and the second count comprises:
multiplying the count by a first weight to produce a first weighted anomaly count;

multiplying the second count by a second weight to produce a second weighted anomaly count; and adding the first weighted anomaly count to the second weighted anomaly count to calculate the risk score.

17. The non-transitory machine readable medium of claim 16, wherein the first and second weights are calculated by a machine learning algorithm.

18. The non-transitory machine readable medium of claim 17, wherein the machine learning algorithm is a regression algorithm trained using historical anomaly counts labelled manually.

19. The non-transitory machine readable medium of claim 17, wherein the operations further comprise:

receiving feedback from the second computing device, the feedback indicating whether there is a threat, and in response, adjusting the weights based upon the feedback.

20. The non-transitory machine readable medium of claim 15, wherein the threshold for the summed value is based upon a time during which the first and second events were generated.

21. The non-transitory machine readable medium of claim 15, wherein identifying the threshold comprises determining the threshold based upon context information of the client computing device.

* * * * *